April 29, 1924.

W. E. RICHTER 1,492,085

UNITARY AUTOMOBILE FRAME AND BUMPER BRACKET

Filed Nov. 20, 1923

WITNESS:
Fred Palm
DEL.

INVENTOR.
Walter E. Richter,
BY
ATTORNEYS.

Patented Apr. 29, 1924.

1,492,085

UNITED STATES PATENT OFFICE.

WALTER E. RICHTER, OF WAUWATOSA, WISCONSIN, ASSIGNOR TO A. O. SMITH CORPORATION, OF MILWAUKEE, WISCONSIN, A CORPORATION OF NEW YORK.

UNITARY AUTOMOBILE FRAME AND BUMPER BRACKET.

Application filed November 20, 1923. Serial No. 675,822.

*To all whom it may concern:*

Be it known that I, WALTER E. RICHTER, a citizen of the United States, and a resident of the city of Wauwatosa, in the county of Milwaukee and State of Wisconsin, have invented certain new and useful Improvements in Unitary Automobile Frames and Bumper Brackets; and I do declare the following to be a clear, exact, and complete description thereof, such as will enable others skilled in the art to which the invention pertains to make and use the same, reference being had to the accompanying drawing, as showing a constructional form in which my invention has been embodied.

Bumpers for automobiles are now generally recognized as part of the standard equipment, and manufacturers of automobiles usually install bumpers of a selected type, which they regard as best adapted to the cars which they produce.

But such bumpers are uniformly extraneous to the construction of the automobile frame, and in the formation of the latter no consideration is given to provisions for attaching the bumpers. It becomes necessary, therefore, to provide the bumper with brackets and clamps of peculiar form which will permit such bumper to be attached to the frame of the automobile. Other special brackets and clamps are required to adapt the same form of bumper to different cars.

My invention relates to a special construction of automobile frame, in the manufacture of which particular consideration has been given to the construction of the frame so that the brackets carrying the bumper are incorporated as a unitary part of the frame. I have provided this in recognition of the demand for bumpers as a part of the standard equipment.

Automobile frames are constructed of pressed steel channel side bars, connected by suitably arranged cross bars. Ordinarily, the spring hangers are placed in the channels at the ends of the side bars and secured therein, and the attached bumper carrying brackets are clamped to the side bars at a point slightly in the rear of the connection between the springs and their hangers.

In carrying out my invention I attach the spring hanger to the underside of the side bar at a point slightly in the rear of the end of the side bar, and in the channel of the latter and in advance of the spring hanger I permanently fix a forwardly projecting bracket which is adapted to permit the convenient attachment and support of the bumper. The nature of the attachment is simple and it is economically effected.

The novel features of my invention will be pointed out in the appended claims.

In the drawing herewith:

Figure 1:
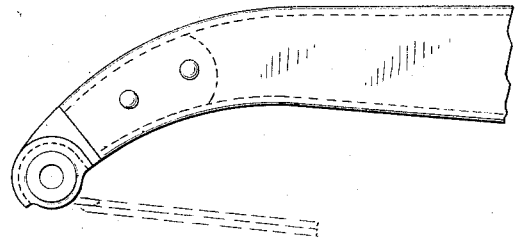
Figure 1 illustrates the customary practice of attaching the usual spring hanger to the front end of the side bar of an automobile frame.

Referring to the drawing, the current construction shown in Fig. 1 is so well understood as to require no explanation here.

Figure 2:
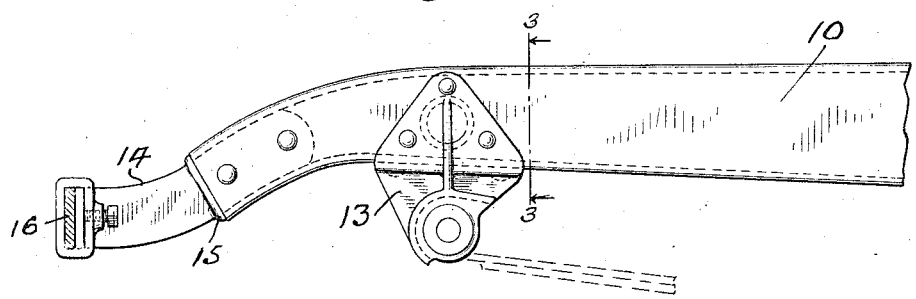
Fig. 2 is a view in side elevation of the front end of one of the side bars of an automobile frame, and shows the changed location of the spring hanger in accordance with the requirements of my invention, the view showing also the bumper bracket as lying in the channel and projecting outwardly from the forward end of the side bar.
Figure 3:
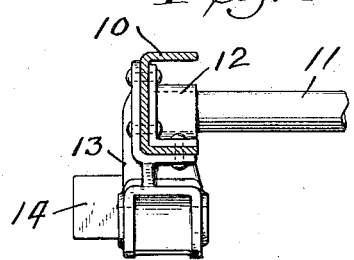
Fig. 3 is a vertical sectional view on the line 3—3, Fig. 2, showing the manner of attaching the spring hanger and one of the cross bars to the side bar.

In Fig. 2 the numeral 10 indicates the front end of a channel side bar drawn into shape from a strip of sheet steel. This side bar does not differ from the usual construction, it having a web and two reinforcing flanges extending at one side thereof so as to provide a channel intermediate such flanges. As shown in Fig. 3, the tubular tension resisting cross bar 11 has upon the end thereof a socket or shoe 12, which is seated in the channel of the side bar. The spring hanger 13 partially embraces the side bar at its exterior in line with the socket or shoe 12 of the cross bar, the parts 12 and 13 being united by a plurality of rivets passed through registering perforations in the web and flange of the side bar and the parts 12 and 13, so as to constitute a fixed and permanent structure.

The attachment thus described is made at a point somewhat in the rear of the end of the side bar, leaving the channel open at its end for the reception and the attachment of the forwardly extending bumper bracket 14, which projects beyond the end of the side bar. This bracket will be shaped to correspond with the particular type of frame, and will be securely fastened preferably by riveting it in fixed position in the channel of the side bar, as described, so as to constitute a unitary and permanent construction. The bumper bracket is provided with a shoulder or other transversely disposed stop 15, which abuts the end of the side bar, so that the impact upon the bumper is arrested and the connecting rivets relieved from shearing strains under the blow to which the bumper may be subjected. Each bracket will be provided at its extended end with a suitable formation for properly supporting the bar, or a plurality of bars, constituting the bumper, a part of one bar of which is indicated in cross-section at 16.

Although I have shown my invention in the relation which it occupies at one end only of the side bar, it is to be understood as a matter of course that in practice it may be applied to both ends of the side bar.

Having thus described my invention, what I claim and desire to secure by Letters Patent of the United States, is:

1. In automobile frame construction, a channel side bar, a bumper supporting bracket secured in the said channel and projecting beyond the end of the side bar, a cross bar having its end seated in the channel of and secured to the side bar, and a spring hanger secured to the side bar at a point in the rear of the bumper bracket.

2. In automobile frame construction, a channel side bar, a bumper supporting bracket secured in the said channel and projecting beyond the end of the side bar, a cross bar having its end seated in the channel of and secured to the side bar, and a spring hanger secured to the side bar at a point in the rear of the bumper bracket and in the line of the cross bar.

3. In automobile frame construction, a channel side bar, a bumper supporting bracket secured in the said channel and projecting beyond the end of the side bar, a cross bar having its end seated in the channel of and secured to the side bar, and a spring hanger secured to the side bar at a point in the rear of the bumper bracket and in the line of the cross bar, and common means for fastening the cross bar and the spring hanger to the side bar.

4. In automobile frame construction, a channel side bar, a bumper supporting bracket fixed in the said channel to constitute a unitary structure and projecting forwardly of the end of the side bar, and means for connecting the parts, the said bracket having a transverse stop abutting the end of the side bar and adapted to arrest the impact and relieve such connecting means from shearing strains.

5. In automobile frame construction, a channel side bar, a bumper supporting bracket secured in the said channel and projecting beyond the end of the side bar, and a spring hanger secured to the side bar in the rear of the bumper bracket, with means for securing the bumper bracket and spring hanger to the side bar in permanent manner to constitute a unitary structure.

6. In automobile frame construction, a channel side bar, a bumper supporting bracket permanently fixed to and projecting beyond the end thereof and attached thereto to constitute a unitary structure, in combination with a spring hanger connection to the side bar in the rear of the bumper bracket.

7. In automobile frame construction, a channel side bar provided at its end with unitarily constituted means for supporting a bumper, in combination with a spring hanger connection to the side bar in the rear of the bumper supporting means.

8. As an article of manufacture, a channel side bar having integrally and unitarily attached to its end bumper supporting means, and a spring hanger connection with the side bar at a point in the rear of the bumper supporting means.

In testimony whereof, I have signed my name at Milwaukee, this 15th day of November, 1923.

W. E. RICHTER.

Witnesses:
W. F. WOOLARD,
EMMA HAUG.